(12) United States Patent
Ominato et al.

(10) Patent No.: US 8,077,370 B1
(45) Date of Patent: Dec. 13, 2011

(54) SCANNING OPTICAL APPARATUS

(75) Inventors: Hiroyuki Ominato, Nagoya (JP);
Hitoshi Fujino, Tajimi (JP); Yoshifumi Nakamura, Nagoya (JP); Hiroki Yukawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/072,717

(22) Filed: Mar. 27, 2011

(30) Foreign Application Priority Data

Jun. 25, 2010 (JP) ................................. 2010-144795

(51) Int. Cl.
*G02B 26/08* (2006.01)
(52) U.S. Cl. ............... 359/207.5; 359/207.3; 359/207.4; 359/216.1
(58) Field of Classification Search .... 359/207.1–207.6; 347/235, 250, 243–244, 258–261
See application file for complete search history.

(56) References Cited

U.S. PATENT DOCUMENTS

| 6,104,522 A | 8/2000 | Hayashi et al. | |
| 6,137,617 A | 10/2000 | Yoshikawa et al. | |
| 2008/0158331 A1* | 7/2008 | Kato | 347/259 |
| 2008/0225105 A1* | 9/2008 | Kudo | 347/235 |

FOREIGN PATENT DOCUMENTS

| JP | H09-281422 A | 10/1997 |
| JP | H10-142543 A | 5/1998 |
| JP | 2000-180781 A | 6/2000 |

* cited by examiner

*Primary Examiner* — James Phan
(74) *Attorney, Agent, or Firm* — Baker Botts L.L.P.

(57) ABSTRACT

In a scanning optical apparatus including a single lens configured to convert a beam deflected by a polygon mirror into a spot-like image on a scanned surface, an angle $\beta 2$ [deg] formed in a main scanning plane between the first optical axis and the second optical axis of the opposite lens surfaces of the lens satisfies the condition of $-0.6<\beta 2 \leq -0.1$, and at least one of the conditions $-0.5<\beta 1<0$ and $-0.1<D2<0.2$ are satisfied where $\beta 1$ indicates an angle [deg] formed in the main scanning plane between the first optical axis and a reference line perpendicular to the scanned surface, and D2 indicates an amount of shift [mm] in the main scanning plane, of a point of intersection between the second optical axis and the exit-side lens surface, from the first optical axis.

5 Claims, 24 Drawing Sheets

FIG. 4

EXAMPLE 1

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 43.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 387.4 |

| CONSTANTS OF LENS | | |
|---|---|---|
| | FIRST SURFACE (INCIDENT SIDE) | SECOND SURFACE (EXIT SIDE) |
| $C_y$ | 1.074E-02 | 2.607E-03 |
| cc | -1.790E+01 | -4.575E+02 |
| $A_4$ | -6.206E-07 | -1.457E-06 |
| $A_6$ | 1.474E-10 | 3.912E-10 |
| $A_8$ | 1.799E-14 | -9.022E-14 |
| $A_{10}$ | -1.531E-17 | 1.716E-17 |
| $A_{12}$ | 2.319E-21 | -1.608E-21 |
| $C_x$ | -5.466E-02 | -8.670E-02 |
| $B_2$ | 1.184E-03 | 3.816E-04 |
| $B_4$ | -1.928E-06 | -5.527E-07 |
| $B_6$ | 2.609E-09 | 5.496E-10 |
| $B_8$ | -1.940E-12 | -3.272E-13 |
| $B_{10}$ | 7.108E-16 | 9.749E-17 |
| $B_{12}$ | -1.013E-19 | -1.113E-20 |
| LENS SHIFT AMOUNT | D1 [mm] | -0.178 |
| LENS TILT AMOUNT | β1 [deg] | -0.211 |
| LENS SURFACE SHIFT AMOUNT | D2 [mm] | 0.058 |
| LENS SURFACE TILT AMOUNT | β2 [deg] | -0.348 |

FIG. 5

EXAMPLE 2

| | | |
|---|---|---|
| WAVELENGTH | $\lambda$[nm] | 788 |
| REFRACTIVE INDEX OF F$\theta$ LENS | n | 1.503 |
| ANGLE OF INCIDENCE ON POLYGON MIRROR | $\alpha$[deg] | 80 |
| DISTANCE FROM POLYGON MIRROR TO F$\theta$ LENS | e[mm] | 45.8 |
| THICKNESS AT CENTER OF F$\theta$ LENS | d[mm] | 11 |
| DISTANCE FROM F$\theta$ LENS TO SCANNED SURFACE | fb[mm] | 132.0 |
| F$\theta$ COEFFICIENT | k[mm] | 160 |
| MAXIMUM SCAN RANGE | [mm] | ±110.0 |
| MAXIMUM SCAN ANGLE OF POLYGON MIRROR | $\theta$max[deg] | 39.4 |
| DISTANCE FROM POLYGON MIRROR TO NATURAL CONVERGENT POINT | fc[mm] | 387.1 |

| CONSTANTS OF LENS | | |
|---|---|---|
| | FIRST SURFACE (INCIDENT SIDE) | SECOND SURFACE (EXIT SIDE) |
| Cy | 1.067E-02 | 2.542E-03 |
| cc | -1.784E+01 | -4.933E+02 |
| $A_4$ | -5.726E-07 | -1.392E-06 |
| $A_6$ | 1.079E-10 | 3.532E-10 |
| $A_8$ | 2.451E-14 | -8.687E-14 |
| $A_{10}$ | -1.314E-17 | 1.909E-17 |
| $A_{12}$ | 1.697E-21 | -1.966E-21 |
| Cx | -5.577E-02 | -8.730E-02 |
| $B_2$ | 1.196E-03 | 3.815E-04 |
| $B_4$ | -2.095E-06 | -5.740E-07 |
| $B_6$ | 2.842E-09 | 5.600E-10 |
| $B_8$ | -2.087E-12 | -3.160E-13 |
| $B_{10}$ | 7.496E-16 | 8.554E-17 |
| $B_{12}$ | -1.041E-19 | -8.260E-21 |
| LENS SHIFT AMOUNT | D1 [mm] | 0.000 |
| LENS TILT AMOUNT | $\beta$1 [deg] | -0.255 |
| LENS SURFACE SHIFT AMOUNT | D2 [mm] | 0.033 |
| LENS SURFACE TILT AMOUNT | $\beta$2 [deg] | -0.286 |

FIG. 6

EXAMPLE 3

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 387.5 |

| CONSTANTS OF LENS | | |
|---|---|---|
| | FIRST SURFACE (INCIDENT SIDE) | SECOND SURFACE (EXIT SIDE) |
| Cy | 1.073E-02 | 2.600E-03 |
| cc | -1.869E+01 | -4.938E+02 |
| $A_4$ | -6.297E-07 | -1.495E-06 |
| $A_6$ | 1.606E-10 | 4.066E-10 |
| $A_8$ | 1.942E-14 | -8.786E-14 |
| $A_{10}$ | -1.668E-17 | 1.759E-17 |
| $A_{12}$ | 2.211E-21 | -2.282E-21 |
| Cx | -5.461E-02 | -8.668E-02 |
| $B_2$ | 8.413E-04 | 2.966E-04 |
| $B_4$ | -1.025E-06 | -3.885E-07 |
| $B_6$ | 1.841E-09 | 4.970E-10 |
| $B_8$ | -1.786E-12 | -4.088E-13 |
| $B_{10}$ | 8.288E-16 | 1.697E-16 |
| $B_{12}$ | -1.468E-19 | -2.726E-20 |
| LENS SHIFT AMOUNT | D1 [mm] | -0.692 |
| LENS TILT AMOUNT | β1 [deg] | 0.000 |
| LENS SURFACE SHIFT AMOUNT | D2 [mm] | 0.188 |
| LENS SURFACE TILT AMOUNT | β2 [deg] | -0.564 |

FIG. 7

EXAMPLE 4

| WAVELENGTH | λ[nm] | 788 |
|---|---|---|
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 387.4 |

| CONSTANTS OF LENS | | |
|---|---|---|
| | FIRST SURFACE (INCIDENT SIDE) | SECOND SURFACE (EXIT SIDE) |
| $C_y$ | 1.074E-02 | 2.613E-03 |
| cc | -1.816E+01 | -4.757E+02 |
| $A_4$ | -5.767E-07 | -1.428E-06 |
| $A_6$ | 1.253E-10 | 3.812E-10 |
| $A_8$ | 1.679E-14 | -8.928E-14 |
| $A_{10}$ | -1.306E-17 | 1.477E-17 |
| $A_{12}$ | 2.163E-21 | -6.874E-22 |
| $C_x$ | -5.497E-02 | -8.687E-02 |
| $B_2$ | 1.335E-03 | 4.197E-04 |
| $B_4$ | -2.564E-06 | -6.866E-07 |
| $B_6$ | 3.554E-09 | 7.105E-10 |
| $B_8$ | -2.617E-12 | -4.136E-13 |
| $B_{10}$ | 9.354E-16 | 1.150E-16 |
| $B_{12}$ | -1.286E-19 | -1.154E-20 |
| LENS SHIFT AMOUNT | D1 [mm] | -0.011 |
| LENS TILT AMOUNT | β1 [deg] | -0.296 |
| LENS SURFACE SHIFT AMOUNT | D2 [mm] | 0.000 |
| LENS SURFACE TILT AMOUNT | β2 [deg] | -0.277 |

FIG. 8

EXAMPLE 5

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 386.9 |

| CONSTANTS OF LENS | | |
|---|---|---|
| | FIRST SURFACE (INCIDENT SIDE) | SECOND SURFACE (EXIT SIDE) |
| Cy | 9.349E+01 | 3.899E+02 |
| cc | -1.731E+01 | -4.386E+02 |
| $A_4$ | -5.907E-07 | -1.407E-06 |
| $A_6$ | 1.353E-10 | 3.750E-10 |
| $A_8$ | 8.137E-15 | -9.198E-14 |
| $A_{10}$ | -1.373E-17 | 1.499E-17 |
| $A_{12}$ | 2.243E-21 | -1.615E-21 |
| Cx | -1.726E+01 | -1.130E+01 |
| $B_2$ | 1.717E-03 | 5.178E-04 |
| $B_4$ | -4.545E-06 | -1.108E-06 |
| $B_6$ | 6.523E-09 | 1.208E-09 |
| $B_8$ | -4.741E-12 | -6.784E-13 |
| $B_{10}$ | 1.677E-15 | 1.767E-16 |
| $B_{12}$ | -2.296E-19 | -1.587E-20 |
| LENS SHIFT AMOUNT | D1 [mm] | -0.240 |
| LENS TILT AMOUNT | β1 [deg] | -0.471 |
| LENS SURFACE SHIFT AMOUNT | D2 [mm] | -0.093 |
| LENS SURFACE TILT AMOUNT | β2 [deg] | -0.100 |

FIG. 9

EXAMPLE 6

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 387.3 |

| CONSTANTS OF LENS | | |
|---|---|---|
| | FIRST SURFACE (INCIDENT SIDE) | SECOND SURFACE (EXIT SIDE) |
| Cy | 1.068E-02 | 2.557E-03 |
| cc | -1.786E+01 | -4.989E+02 |
| $A_4$ | -5.654E-07 | -1.381E-06 |
| $A_6$ | 1.133E-10 | 3.503E-10 |
| $A_8$ | 1.436E-14 | -8.510E-14 |
| $A_{10}$ | -9.576E-18 | 1.597E-17 |
| $A_{12}$ | 1.478E-21 | -9.662E-22 |
| Cx | -5.549E-02 | -8.715E-02 |
| $B_2$ | 1.113E-03 | 3.573E-04 |
| $B_4$ | -1.558E-06 | -4.402E-07 |
| $B_6$ | 1.747E-09 | 3.241E-10 |
| $B_8$ | -1.107E-12 | -1.302E-13 |
| $B_{10}$ | 3.404E-16 | 1.650E-17 |
| $B_{12}$ | -3.902E-20 | 1.595E-21 |
| LENS SHIFT AMOUNT | D1 [mm] | 0.000 |
| LENS TILT AMOUNT | β1 [deg] | -0.296 |
| LENS SURFACE SHIFT AMOUNT | D2 [mm] | 0.000 |
| LENS SURFACE TILT AMOUNT | β2 [deg] | -0.269 |

FIG. 10

EXAMPLE 7

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 386.3 |

| CONSTANTS OF LENS | | |
|---|---|---|
| | FIRST SURFACE (INCIDENT SIDE) | SECOND SURFACE (EXIT SIDE) |
| $C_y$ | 1.057E-02 | 2.444E-03 |
| cc | -1.783E+01 | -4.765E+02 |
| $A_4$ | -6.082E-07 | -1.451E-06 |
| $A_6$ | 1.291E-10 | 3.883E-10 |
| $A_8$ | 2.001E-14 | -9.674E-14 |
| $A_{10}$ | -1.500E-17 | 1.931E-17 |
| $A_{12}$ | 2.094E-21 | -2.122E-21 |
| $C_x$ | -6.392E-02 | -9.156E-02 |
| $B_2$ | 6.797E-04 | 2.433E-04 |
| $B_4$ | -1.362E-06 | -4.613E-07 |
| $B_6$ | 2.472E-09 | 6.044E-10 |
| $B_8$ | -2.219E-12 | -4.524E-13 |
| $B_{10}$ | 9.491E-16 | 1.677E-16 |
| $B_{12}$ | -1.561E-19 | -2.422E-20 |
| LENS SHIFT AMOUNT | D1 [mm] | 0.000 |
| LENS TILT AMOUNT | β1 [deg] | 0.000 |
| LENS SURFACE SHIFT AMOUNT | D2 [mm] | 0.184 |
| LENS SURFACE TILT AMOUNT | β2 [deg] | -0.302 |

FIG. 11

COMPARATIVE EXAMPLE 1

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 387.1 |

| CONSTANTS OF LENS | | |
|---|---|---|
| | FIRST SURFACE (INCIDENT SIDE) | SECOND SURFACE (EXIT SIDE) |
| Cy | 1.072E-02 | 2.583E-03 |
| cc | -1.707E+01 | -4.097E+02 |
| $A_4$ | -6.127E-07 | -1.428E-06 |
| $A_6$ | 1.463E-10 | 3.849E-10 |
| $A_8$ | 1.222E-14 | -9.167E-14 |
| $A_{10}$ | -1.432E-17 | 1.676E-17 |
| $A_{12}$ | 2.208E-21 | -1.809E-21 |
| Cx | -3.640E-02 | -7.630E-02 |
| $B_2$ | 2.581E-03 | 6.523E-04 |
| $B_4$ | -4.922E-06 | -1.074E-06 |
| $B_6$ | 6.998E-09 | 1.237E-09 |
| $B_8$ | -4.705E-12 | -7.379E-13 |
| $B_{10}$ | 1.361E-15 | 1.995E-16 |
| $B_{12}$ | -1.216E-19 | -1.801E-20 |
| LENS SHIFT AMOUNT | D1 [mm] | 0.834 |
| LENS TILT AMOUNT | β1 [deg] | -0.561 |
| LENS SURFACE SHIFT AMOUNT | D2 [mm] | -0.147 |
| LENS SURFACE TILT AMOUNT | β2 [deg] | 0.000 |

FIG. 12

COMPARATIVE EXAMPLE 2

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 386.9 |

| CONSTANTS OF LENS | | |
|---|---|---|
| | FIRST SURFACE (INCIDENT SIDE) | SECOND SURFACE (EXIT SIDE) |
| Cy | 9.348E+01 | 3.900E+02 |
| cc | -1.698E+01 | -4.118E+02 |
| $A_4$ | -6.064E-07 | -1.417E-06 |
| $A_6$ | 1.425E-10 | 3.819E-10 |
| $A_8$ | 9.646E-15 | -9.321E-14 |
| $A_{10}$ | -1.422E-17 | 1.574E-17 |
| $A_{12}$ | 2.355E-21 | -1.550E-21 |
| Cx | -2.219E+01 | -1.229E+01 |
| $B_2$ | 2.059E-03 | 5.731E-04 |
| $B_4$ | -4.788E-06 | -1.065E-06 |
| $B_6$ | 6.846E-09 | 1.176E-09 |
| $B_8$ | -4.917E-12 | -6.673E-13 |
| $B_{10}$ | 1.678E-15 | 1.705E-16 |
| $B_{12}$ | -2.148E-19 | -1.389E-20 |
| LENS SHIFT AMOUNT | D1 [mm] | -0.240 |
| LENS TILT AMOUNT | β1 [deg] | -0.546 |
| LENS SURFACE SHIFT AMOUNT | D2 [mm] | -0.135 |
| LENS SURFACE TILT AMOUNT | β2 [deg] | -0.050 |

FIG. 13

COMPARATIVE EXAMPLE 3

| | | |
|---|---|---|
| WAVELENGTH | λ[nm] | 788 |
| REFRACTIVE INDEX OF Fθ LENS | n | 1.503 |
| ANGLE OF INCIDENCE ON POLYGON MIRROR | α[deg] | 80 |
| DISTANCE FROM POLYGON MIRROR TO Fθ LENS | e[mm] | 45.8 |
| THICKNESS AT CENTER OF Fθ LENS | d[mm] | 11 |
| DISTANCE FROM Fθ LENS TO SCANNED SURFACE | fb[mm] | 132.0 |
| Fθ COEFFICIENT | k[mm] | 160 |
| MAXIMUM SCAN RANGE | [mm] | ±110.0 |
| MAXIMUM SCAN ANGLE OF POLYGON MIRROR | θmax[deg] | 39.4 |
| DISTANCE FROM POLYGON MIRROR TO NATURAL CONVERGENT POINT | fc[mm] | 390.6 |

| CONSTANTS OF LENS | | |
|---|---|---|
| | FIRST SURFACE (INCIDENT SIDE) | SECOND SURFACE (EXIT SIDE) |
| Cy | 1.050E-02 | 2.380E-03 |
| cc | -1.981E+01 | -6.478E+02 |
| $A_4$ | -5.331E-07 | -1.448E-06 |
| $A_6$ | 9.330E-11 | 3.770E-10 |
| $A_8$ | 2.160E-14 | -7.544E-14 |
| $A_{10}$ | -1.579E-17 | 1.704E-18 |
| $A_{12}$ | 2.822E-21 | 1.781E-21 |
| Cx | -6.040E-02 | -8.970E-02 |
| $B_2$ | 5.452E-04 | 2.031E-04 |
| $B_4$ | -1.290E-07 | -1.496E-07 |
| $B_6$ | 3.060E-11 | 7.335E-11 |
| $B_8$ | -1.750E-14 | -3.116E-14 |
| $B_{10}$ | -6.243E-18 | 3.317E-18 |
| $B_{12}$ | 3.731E-21 | 7.981E-22 |
| LENS SHIFT AMOUNT | D1 [mm] | -0.886 |
| LENS TILT AMOUNT | β1 [deg] | 0.000 |
| LENS SURFACE SHIFT AMOUNT | D2 [mm] | 0.000 |
| LENS SURFACE TILT AMOUNT | β2 [deg] | -0.367 |

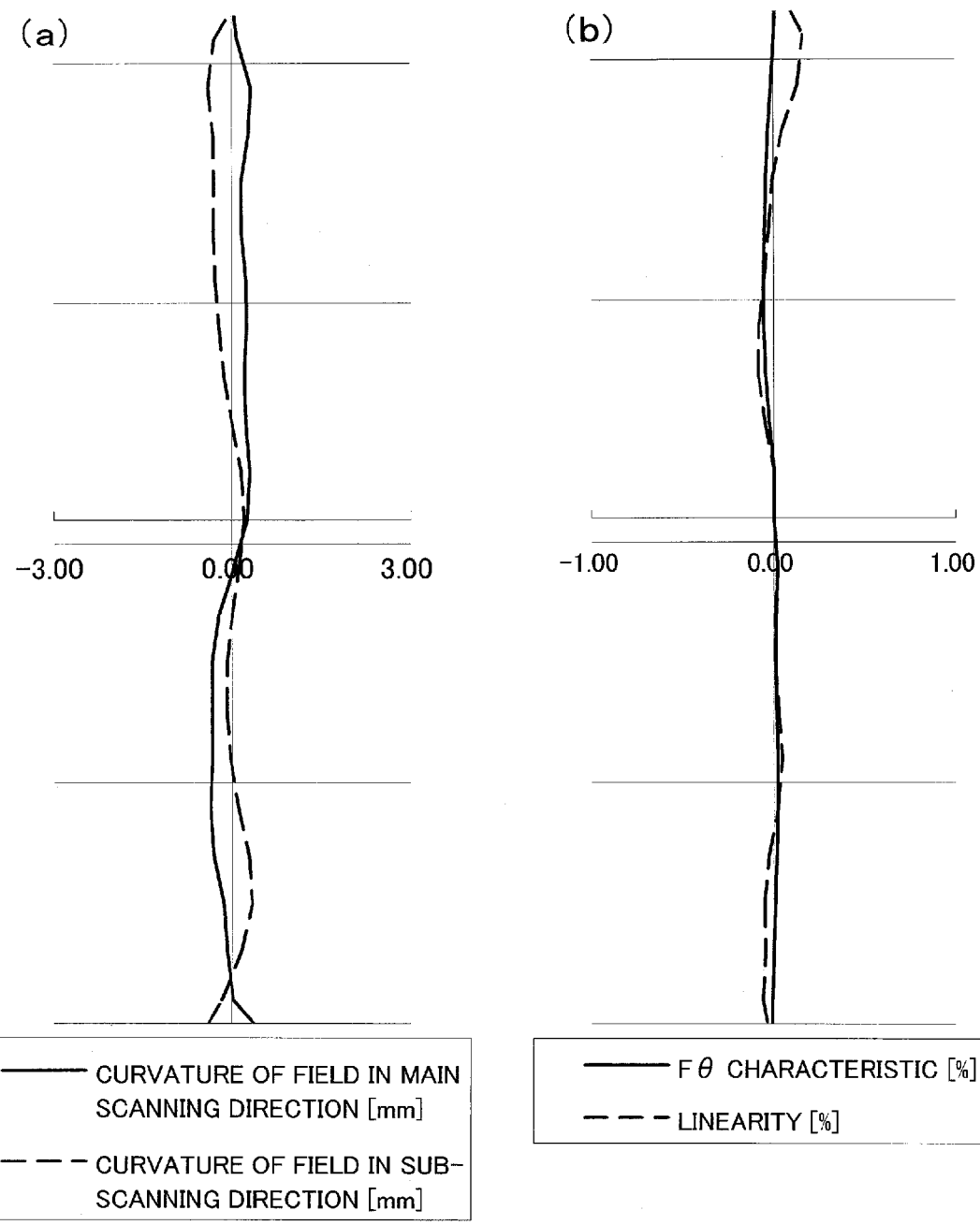

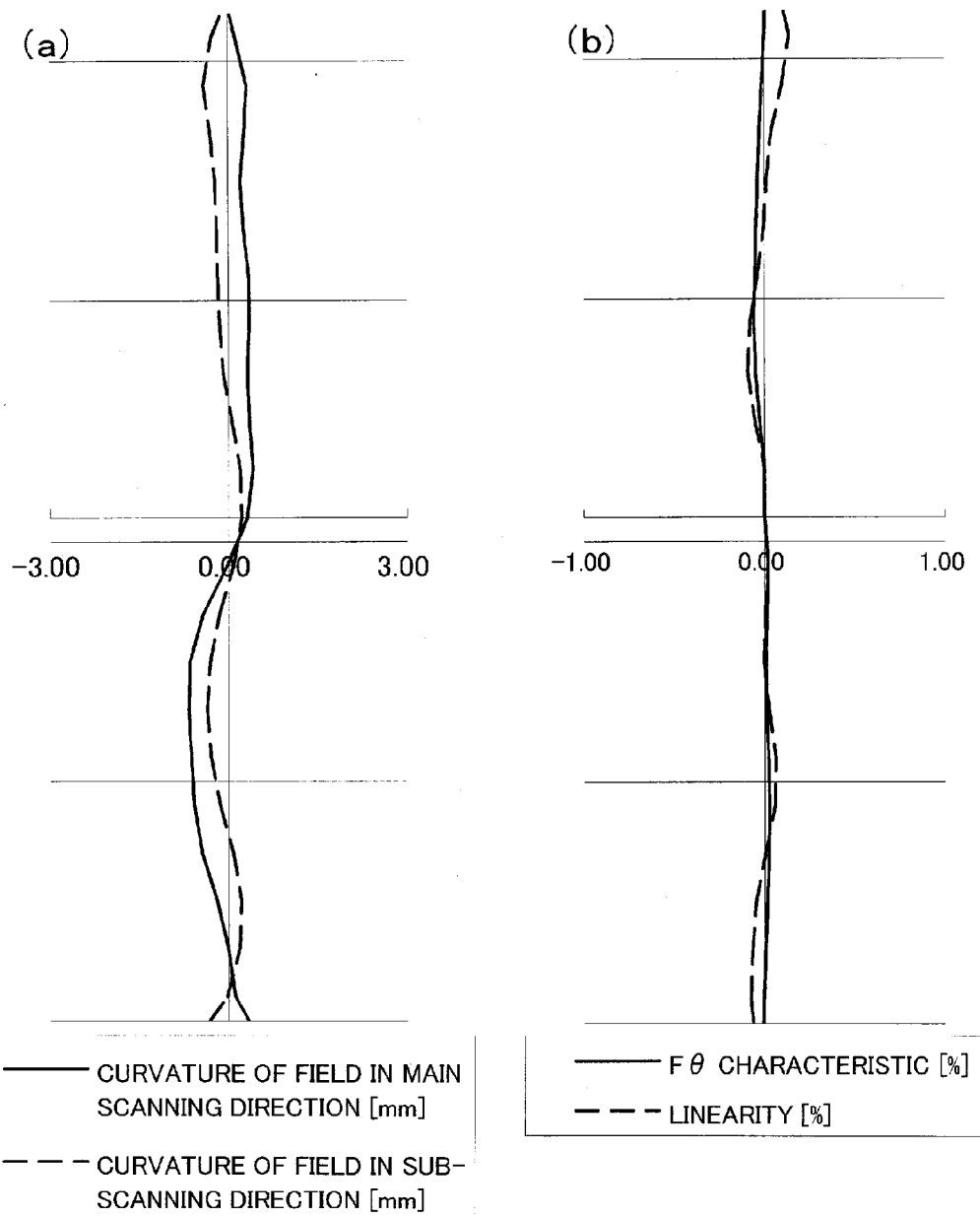

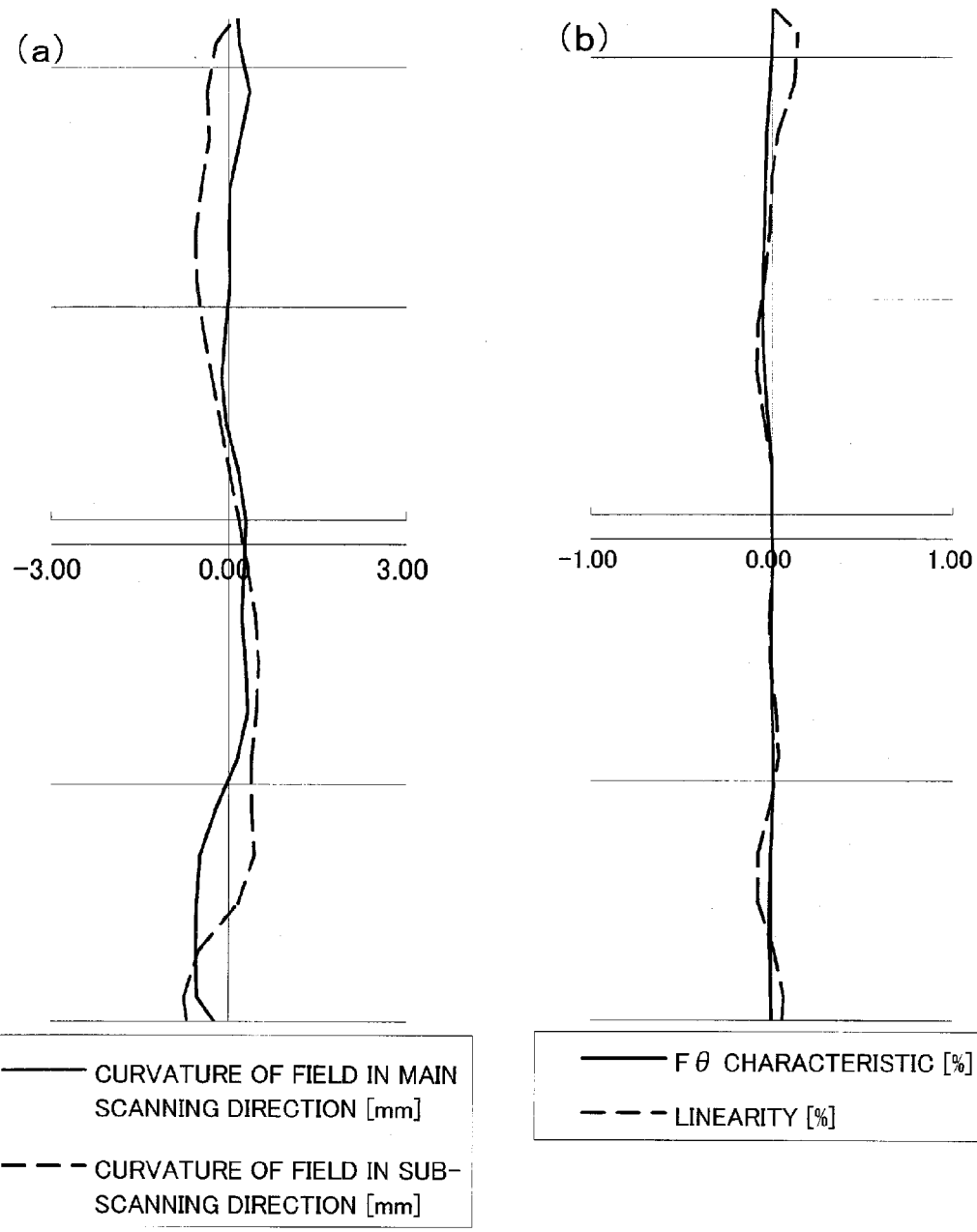

FIG. 24

| | D1 [mm] | β1 [deg] | D2 [mm] | β2 [deg] | CURVATURE OF FIELD IN MAIN SCANNING DIRECTION PV [mm] | CURVATURE OF FIELD IN SUB-SCANNING DIRECTION PV [mm] | Fθ CHARACTER-ISTIC PV [%] | LINEARITY PV [%] | EVALUA-TION |
|---|---|---|---|---|---|---|---|---|---|
| EXAMPLE 1 | -0.178 | -0.211 | 0.058 | -0.348 | 0.726 | 0.739 | 0.075 | 0.247 | OK |
| EXAMPLE 2 | 0.000 | -0.255 | 0.033 | -0.286 | 1.080 | 0.635 | 0.085 | 0.234 | OK |
| EXAMPLE 3 | -0.692 | 0.000 | 0.188 | -0.564 | 0.904 | 1.254 | 0.060 | 0.228 | OK |
| EXAMPLE 4 | -0.011 | -0.296 | 0.000 | -0.277 | 1.001 | 0.694 | 0.095 | 0.276 | OK |
| EXAMPLE 5 | -0.240 | -0.471 | -0.093 | -0.100 | 2.488 | 2.604 | 0.085 | 0.196 | OK |
| EXAMPLE 6 | 0.000 | -0.296 | 0.000 | -0.269 | 1.017 | 0.799 | 0.101 | 0.274 | OK |
| EXAMPLE 7 | 0.000 | 0.000 | 0.184 | -0.302 | 2.147 | 1.311 | 0.046 | 0.134 | OK |
| MAXIMUM | 0.000 | 0.000 | 0.188 | -0.100 | | | | | |
| MINIMUM | -0.692 | -0.471 | -0.093 | -0.564 | | | | | |
| | | | | | | | | | |
| COMPARATIVE EXAMPLE 1 | 0.834 | -0.561 | -0.147 | 0.000 | 3.193 | 3.565 | 0.093 | 0.228 | NG |
| COMPARATIVE EXAMPLE 2 | -0.240 | -0.546 | -0.135 | -0.050 | 3.083 | 3.489 | 0.093 | 0.206 | NG |
| COMPARATIVE EXAMPLE 3 | -0.886 | 0.000 | 0.000 | -0.367 | 3.554 | 2.477 | 0.323 | 0.441 | NG |

SCANNING OPTICAL APPARATUS

CROSS-REFERENCE TO RELATED APPLICATION(S)

This application claims priority from Japanese Patent Application No. 2010-144795 filed on Jun. 25, 2010, the disclosure of which is incorporated herein by reference in its entirety.

TECHNICAL FIELD

The present invention relates to a scanning optical apparatus suitable for use in an electrophotographic image forming apparatus.

BACKGROUND ART

In a scanning optical apparatus for scanning a target surface with a beam of light emitted from a light source using a polygon mirror deflecting the beam of light, the position in which the beam of light strikes each reflecting surface (each of specular surfaces of the polygon mirror) would vary according to a deflection direction in which the beam of light reflected therefrom travels. This phenomenon is called "sag". The sag would be a cause of curvature of field or other kind of degradation of images on the target surface.

To reduce such adverse effects of the sag, the position in which the beam of light from the light source strikes each reflecting surface (i.e., the distance between the center of rotation of the polygon mirror and the optical axis of an optical system from which the beam of light from the light source comes to the polygon mirror) may be adjusted within a predetermined range of values such that the sag is rendered nearly symmetric with respect to the reference deflected chief ray.

SUMMARY

Thorough study conducted by the inventors has revealed that even if a sag is not rendered nearly symmetric with respect to the reference deflected chief ray but shifted to one side, the optical properties such as curvature of field can be improved satisfactorily.

It is one aspect of the present invention to provide a scanning optical apparatus which can reduce curvature of field and form a desired image on a target surface to be scanned.

More specifically, according to one embodiment, a scanning optical apparatus is provided which comprises an light source, a first optical element, a second optical element, a polygon mirror, a third optical system, and a synchronization detection beam path. The first optical element is configured to convert light emitted from the light source into a beam of light. The second optical element is configured to convert the beam of light having passed through the first optical element into a linear image extending in a main scanning direction. The polygon mirror is configured to deflect the beam of light having passed through the second optical element in the main scanning direction. The third optical element is configured to convert the beam of light having been deflected by the polygon mirror into a spot-like image to be focused on a scanned surface. The third optical element is a single lens having a pair of opposite incident-side and exit-side lens surfaces having first and second optical axes, respectively. Each of the pair of opposite lens surfaces is aspheric in a main scanning direction, and has a curvature in a sub-scanning direction varying continuously and symmetrically from a position corresponding to the optical axis thereof outward in a main scanning direction. Each of the pair of lens surfaces has a shape symmetric in the main scanning direction with respect to a sub-scanning plane containing the optical axis thereof. The synchronization detection beam path is configured such that a beam of light travels therethrough from the polygon mirror to a position that is opposite to the light source across the optical axes of the pair of lens surfaces, to be directed to a sensing element producing a signal for synchronization at a start-of-scan position. A distance h between a center of rotation of the polygon mirror and a center of the beam of light incident on the polygon mirror fulfills the following conditions (1):

$$R(\sin((\alpha-\theta_{bd})/2)-\cos((\alpha-\theta_{bd})/2)\times\tan(\pi/N))+(b_{bd}/2)\times \cos((\alpha-\theta_{bd})/2)<h, \text{ and } h<R(\sin((\alpha-\theta_{eos})/2)+\cos((\alpha-\theta_{eos})/2)\times\tan(\pi/N))-(b_{eos}/2)\times\cos((\alpha-\theta_{eos})/2) \quad (1)$$

where R indicates a radius of an inscribed circle of the polygon mirror, N indicates the number of specular surfaces of the polygon mirror, α indicates an angle [rad] formed by the beam of light incident on the polygon mirror with a reference line extending in a direction of travel of the beam of light to be incident on the scanned surface at right angles after being reflected off the polygon mirror, $\theta_{bd}$ indicates an angle [rad] formed by the beam of light traveling from the polygon mirror along the synchronization detection beam path with the reference line, $\theta_{eos}$ indicates an angle [rad] formed by the beam of light reflected off the polygon mirror at an end-of-scan position with the reference line, and $b_{eos}$ and $b_{bd}$ indicate breadths of the beam of light in the main scanning direction on each of the specular surfaces of the polygon mirror at the end-of-scan position and at a position in which the beam of light reflected off the polygon mirror travels along the synchronization detection beam path, respectively. In addition, the following condition (2) and at least one of the following conditions (3) and (4) are satisfied:

$$-0.6<\beta 2\leq -0.1 \quad (2)$$

$$-0.5<\beta 1<0 \quad (3)$$

$$-0.1<D2<0.2 \quad (4)$$

where β2 indicates an angle [deg] formed in a main scanning plane between the first optical axis and the second optical axis of the third optical element, β1 indicates an angle [deg] formed in the main scanning plane between the first optical axis and the reference line, and D2 indicates an amount of shift [mm] in the main scanning plane, of a point of intersection between the second optical axis and the exit-side lens surface, from the first optical axis.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIG. 4 is a table showing characteristics (including constants of the lens) of an optical system embodied in accordance with Example 1;

FIG. 5 is a table showing characteristics (including constants of the lens) of an optical system embodied in accordance with Example 2;

FIG. 6 is a table showing characteristics (including constants of the lens) of an optical system embodied in accordance with Example 3;

FIG. 7 is a table showing characteristics (including constants of the lens) of an optical system embodied in accordance with Example 4;

FIG. 8 is a table showing characteristics (including constants of the lens) of an optical system embodied in accordance with Example 5;

FIG. 9 is a table showing characteristics (including constants of the lens) of an optical system embodied in accordance with Example 6;

FIG. 10 is a table showing characteristics (including constants of the lens) of an optical system embodied in accordance with Example 7;

FIG. 11 is a table showing characteristics (including constants of the lens) of an optical system implemented in accordance with Comparative Example 1;

FIG. 12 is a table showing characteristics (including constants of the lens) of an optical system implemented in accordance with Comparative Example 2;

FIG. 13 is a table showing characteristics (including constants of the lens) of an optical system implemented in accordance with Comparative Example 3;

FIG. 14A is a graph showing curvatures of field in the main scanning direction and in the sub-scanning direction, obtained from Example 1;

FIG. 14B is a graph showing f-theta and linearity characteristics, obtained from Example 1;

FIG. 15A is a graph showing curvatures of field in the main scanning direction and in the sub-scanning direction, obtained from Example 2;

FIG. 15B is a graph showing f-theta and linearity characteristics, obtained from Example 2;

FIG. 16A is a graph showing curvatures of field in the main scanning direction and in the sub-scanning direction, obtained from Example 3;

FIG. 16B is a graph showing f-theta and linearity characteristics, obtained from Example 3;

FIG. 24 is a table showing D1, D2, β1, β2 of Examples 1-7 and Comparative Examples 1-3, and optical performances obtained therefrom.

DESCRIPTION OF EMBODIMENTS

A detailed description will be given of illustrative embodiments of the present invention with reference made to the drawings where necessary.

Figure 1:
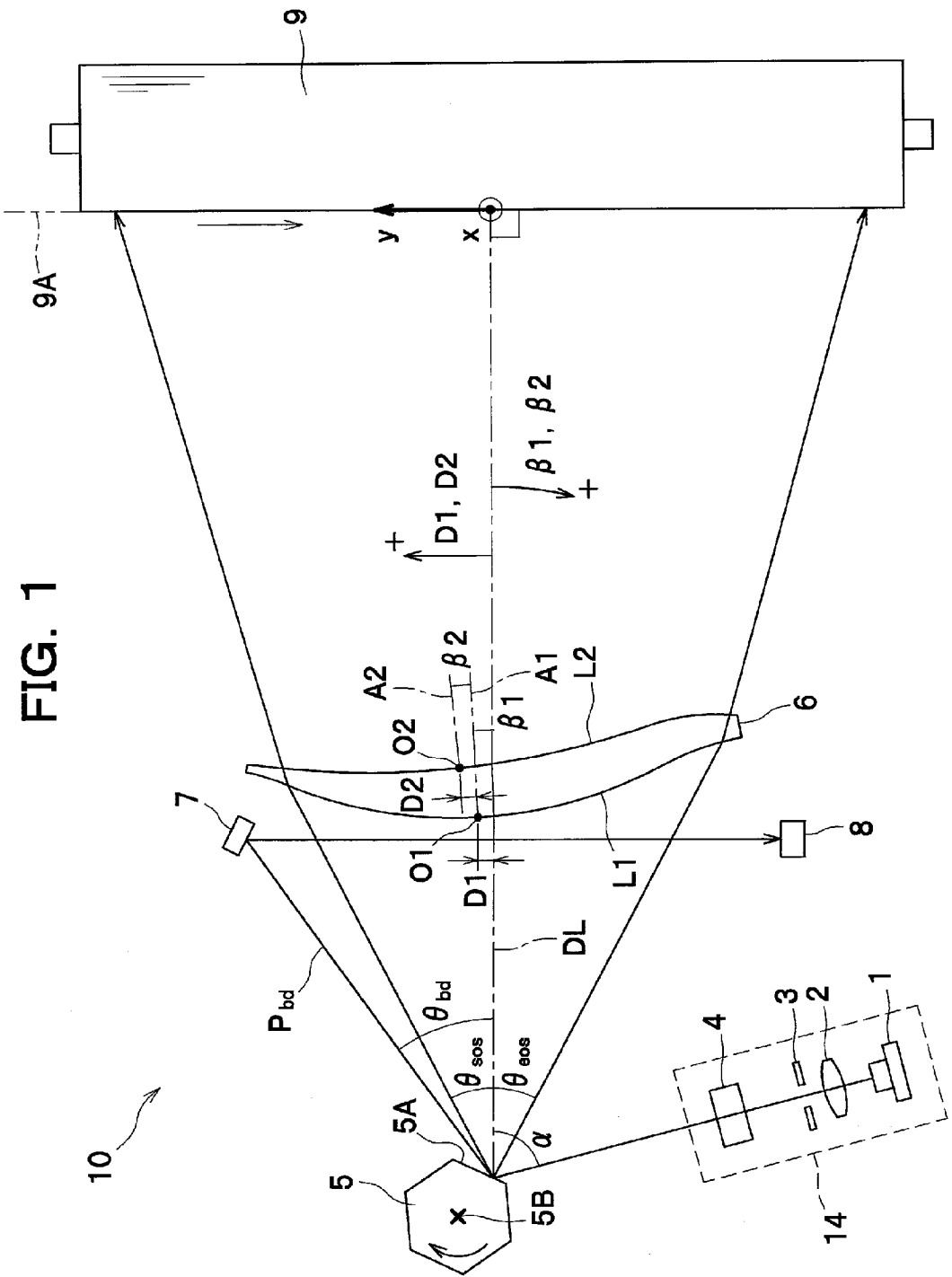
FIG. 1 is a sectional view of a scanning optical apparatus according to one exemplary embodiment taken along a main scanning plane.

As seen in FIG. 1, a scanning optical apparatus 10 according to one exemplary embodiment includes an illumination optical system 14, a polygon mirror 5, and an f-theta lens (fθ lens) 6 as an example of a third optical element, so that a laser beam emitted from the illumination optical system 14 is converted into a spot-like image with which a peripheral surface 9A on a photoconductor drum 9 is scanned.

The illumination optical system 14 includes a semiconductor laser 1, a collimating lens 2 as an example of a first optical element, an aperture stop 3, and a cylindrical lens 4 as an example of a second optical element.

Figure 2:
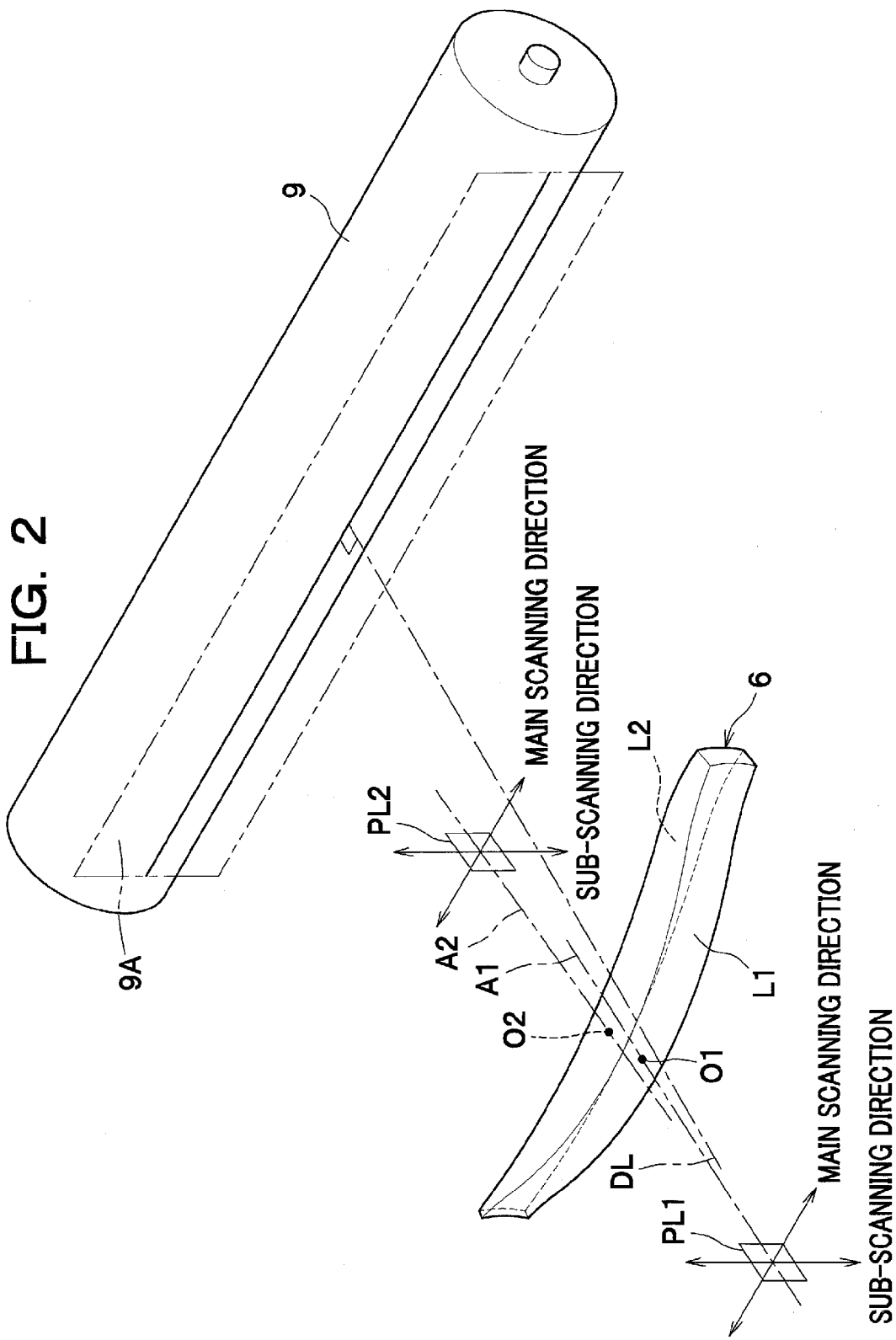
FIG. 2 is a perspective view for explaining a main scanning direction and a sub-scanning direction for each of lens surfaces of a lens.

The semiconductor laser 1 includes one or more of light sources. In one embodiment where a plurality of light sources are provided, a plurality of light-emitting elements (not shown) are arrayed substantially in a sub-scanning direction (perpendicular to a main scanning direction; i.e., a direction of an axis of rotation of the polygon mirror 5 in FIG. 1; see also FIG. 2). The light-emitting elements may be arranged in positions shifted from each other in the sub-scanning direction, and where necessary also shifted from each other in the main scanning direction.

The collimating lens 2 is a lens configured to convert laser light emitted from the semiconductor laser 1 into a beam of light that is a parallel or nearly parallel beam. It is to be understood, however, that the first optical element consistent with the present invention is not limited to such a collimating lens but may be any other kind of coupling lens configured to convert light into a predetermined beam of light which may be either of a parallel beam, a converging beam or a slightly diverging beam.

The aperture stop 3 is a member having an opening which determines a diameter of the beam of light formed by the collimating lens 2.

The cylindrical lens 4 is a lens configured to convert the beam of light having passed through the collimating lens 2 and the aperture stop 3 into a linear image extending in the main scanning direction on a specular surface 5A of the polygon mirror 5.

The polygon mirror 5 has a plurality of specular surfaces 5A disposed equidistantly from an axis 5B of rotation of the polygon mirror 5; the polygon mirror 5 shown in FIG. 1 has six specular surfaces 5A. The polygon mirror 5 spins at a constant rotational speed about the axis of rotation 5B and reflects and deflects a beam of light having passed through the cylindrical lens 4 in the main scanning direction. The term "main scanning direction" used herein is defined as a direction of deflection of a beam of light.

The scanning apparatus 10 includes only one f-theta lens 6. The f-theta lens 6 is configured to convert the beam of light having been reflected and thus deflected by the polygon mirror 5 into a spot-like image to be focused on the surface 9A. The f-theta lens 6 is also configured to correct an optical face tangle error of each specular surface 5A of the polygon mirror 5. The f-theta lens 6 has f-theta characteristics such that the beam of light deflected at a constant angular velocity by the polygon mirror 5 is converted into a beam of light that scans the surface 9A at a constant linear velocity. The f-theta lens 6 has a pair of opposite lens surfaces, namely, an incident-side (polygon mirror 5 side) lens surface L1 and an exit-side (surface 9A side) lens surface L2. The lens surfaces L1, L2 are aspheric in the main scanning direction, and are both tonic surfaces. The curvature of each lens surface L1, L2 in a sub-scanning plane (cross section perpendicular to the main scanning direction) varies continuously and symmetrically from a position corresponding to an optical axis thereof (a first optical axis A1 of the lens surface L1, a second optical axis A2 of the lens surface L2) outward in the main scanning direction within an effective region.

In this embodiment, each lens surface L1, L2 can be expressed in any form without limitation, for example, by a bivariate polynomial with respect to the main scanning direction (y) and the sub-scanning direction (x), such as given by the following formula (5):

$$z_j = f(x, y) = \sum_m \sum_n (a_{m,n}) x^m y^n \qquad (5)$$

where $a_{m,n}$ is a coefficient.

The lens surface L1 has a shape symmetric with respect to the sub-scanning plane PL1 (see FIG. 2) containing the optical axis thereof (the first optical axis A1). The lens surface L2 also has a shape symmetric with respect to the sub-scanning plane PL2 (see FIG. 2) containing the optical axis thereof (the second optical axis A2). With this configuration, the lens surfaces L1, L2 can be fabricated easily. The lens surfaces L1, L2 may be fabricated for example by plastic injection molding or glass molding, using a mold having cavity surfaces of shapes reversely contoured to fit the shapes of the lens surfaces L1, L2, respectively. Since each lens surface L1, L2 has a shape symmetric with respect to the sub-scanning plane PL1, PL2 containing the optical axis thereof. A1, A2, a correction made in making the mold and an inspection made to the shape of the mold and the castings (molded products) can be carried out easily.

In the scanning optical apparatus 10 according to this embodiment, a mirror 7 is disposed at a position opposite to the semiconductor laser 1 across the first and second optical axes A1, A2 (of the lens surfaces L1, L2 of the f-theta lens 6), and a sensing element 8 which produces a signal for synchronization at a start-of-scan position is disposed at a semiconductor laser 1 side with respect to the optical axes A1, A2. The polygon mirror 5 in this embodiment is configured to spin clockwise in FIG. 1, so that the beam of light is deflected, starting from an upper position downward. The start-of-scan position is located in a position where the beam of light to be deflected enters the effective region on the surface 9A (i.e., an angular position indicated by $\theta_{sos}$ in FIG. 1), and a synchronization detection beam path $P_{bd}$ through which the beam of light reflected off the polygon mirror 5 (and starting to sweep down but not yet entering the effective region) travels from the polygon mirror 5 to the mirror 7 is disposed outside the start-of-scan position. The sensing element 8 is disposed in a position such that the beam of light traveling along the synchronization detection beam path $P_{bd}$ to the mirror 7 is directed therefrom and received by the sensing element 8.

The beam of light striking the specular surface 5A of the polygon mirror 5 in the form of a linear image extending in the main scanning direction is deflected at the polygon mirror 5, and converted by the f-theta lens 6 into a spot-like image to be focused on the surface 9A.

To appropriately determine a layout of the optical system in which the beam of light is deflected by the polygon mirror 5, the arrangement of its constituent parts may be designed such that the beam of light emitted from the illumination optical system 14 and reflected off the polygon mirror 5 travels in all necessary directions covering the entire effective region from the start-of-scan position to the end-of-scan position (i.e., an angular position indicated by $\theta_{eos}$ in FIG. 1) inclusive, and including the direction of the synchronization detection beam path $P_{bd}$ (i.e., to the position of the mirror 7).

Figure 3:
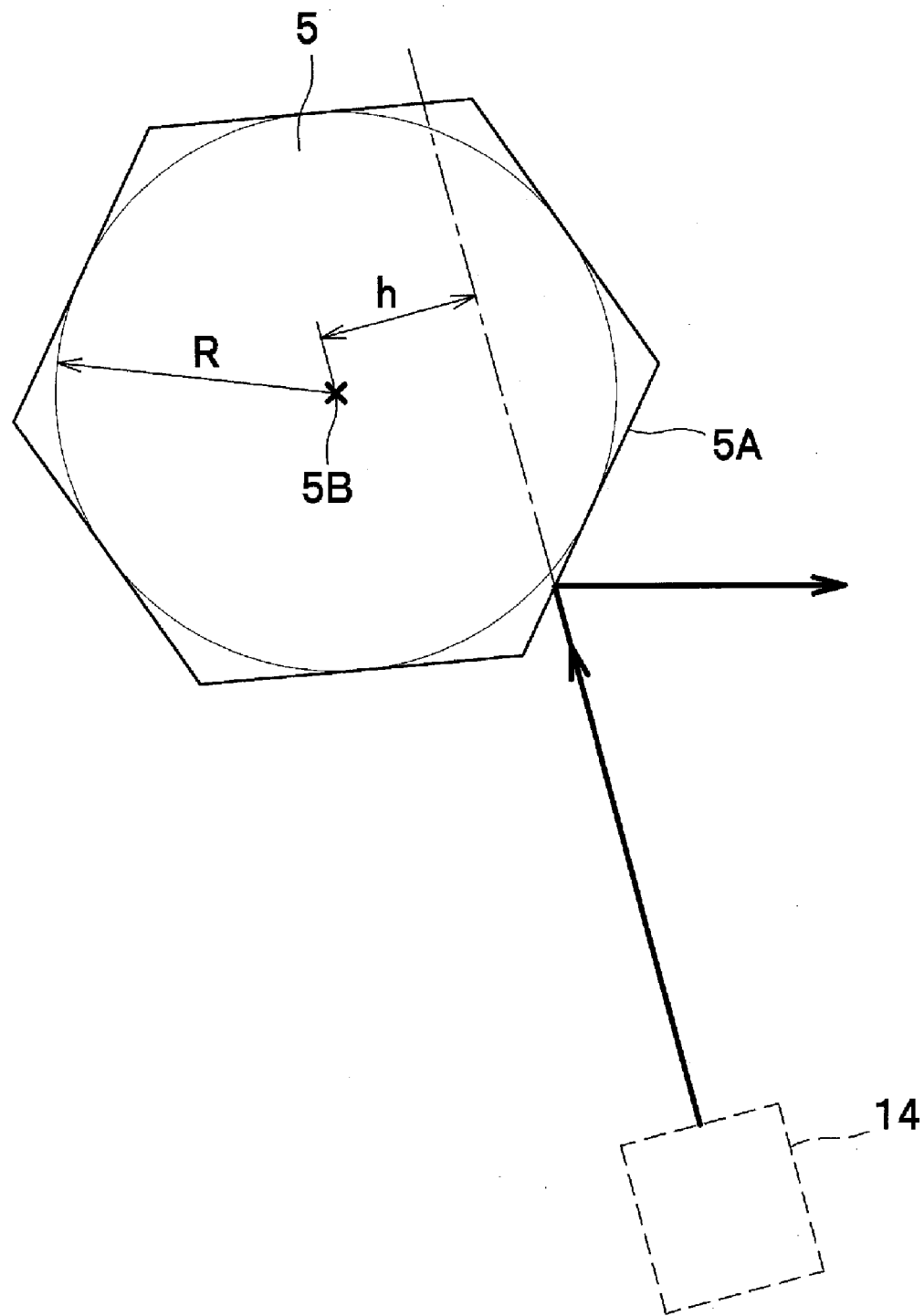
FIG. 3 is an enlarged view of a polygon mirror.
Figure 17:
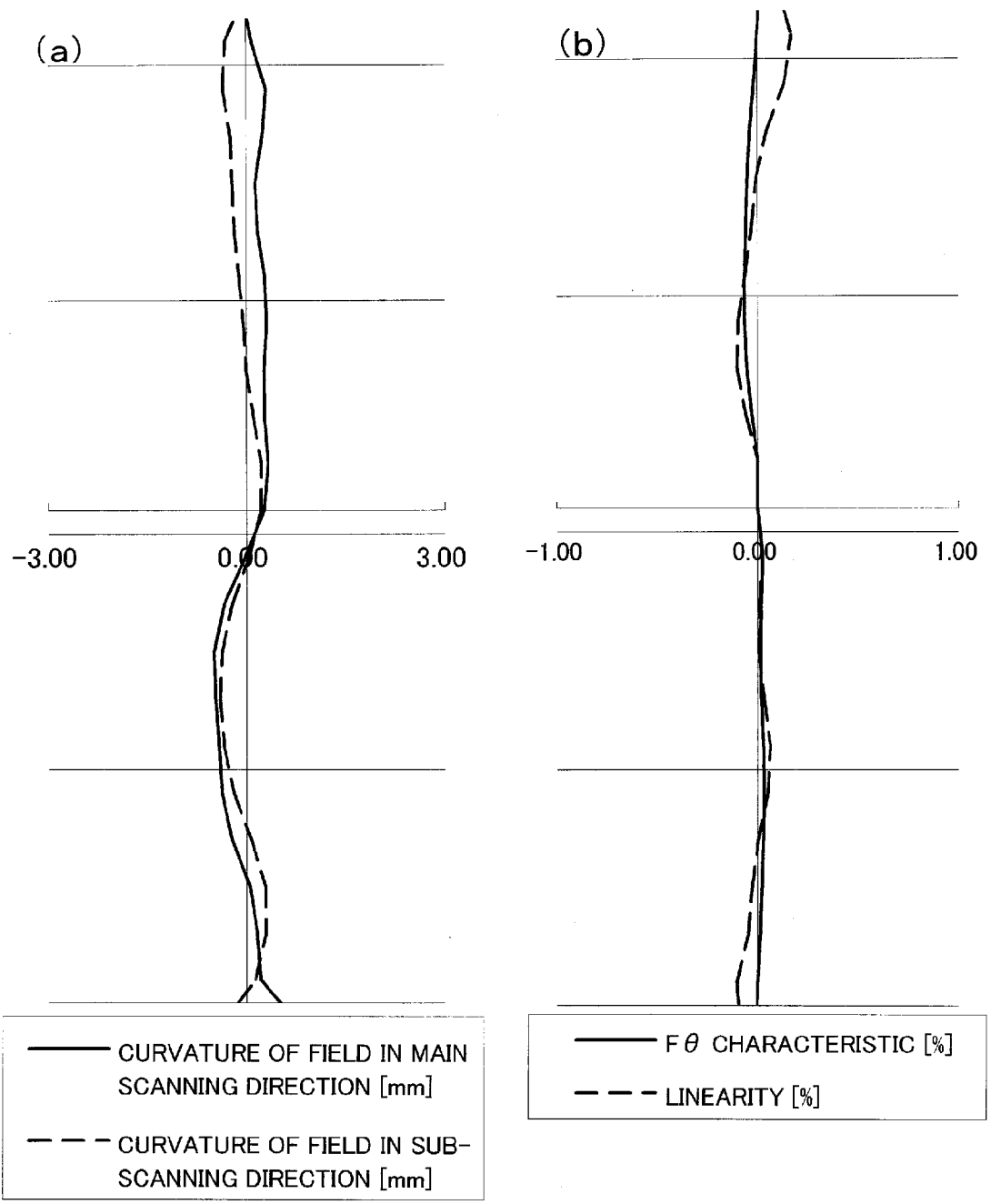
FIG. 17A is a graph showing curvatures of field in the main scanning direction and in the sub-scanning direction, obtained from Example 4.
FIG. 17B is a graph showing f-theta and linearity characteristics, obtained from Example 4.
Figure 18:
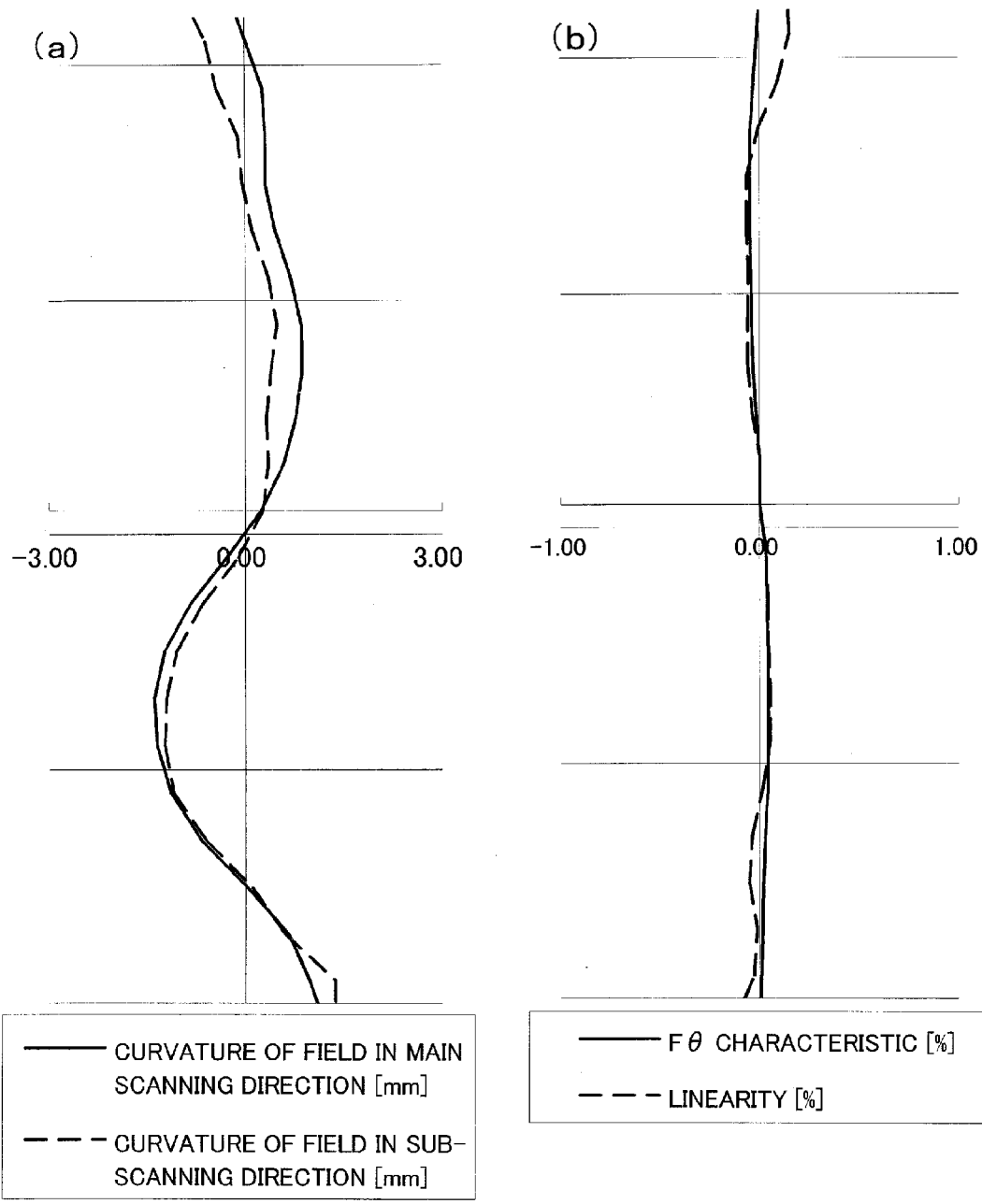
FIG. 18A is a graph showing curvatures of field in the main scanning direction and in the sub-scanning direction, obtained from Example 5.
FIG. 18B is a graph showing f-theta and linearity characteristics, obtained from Example 5.
Figure 19:
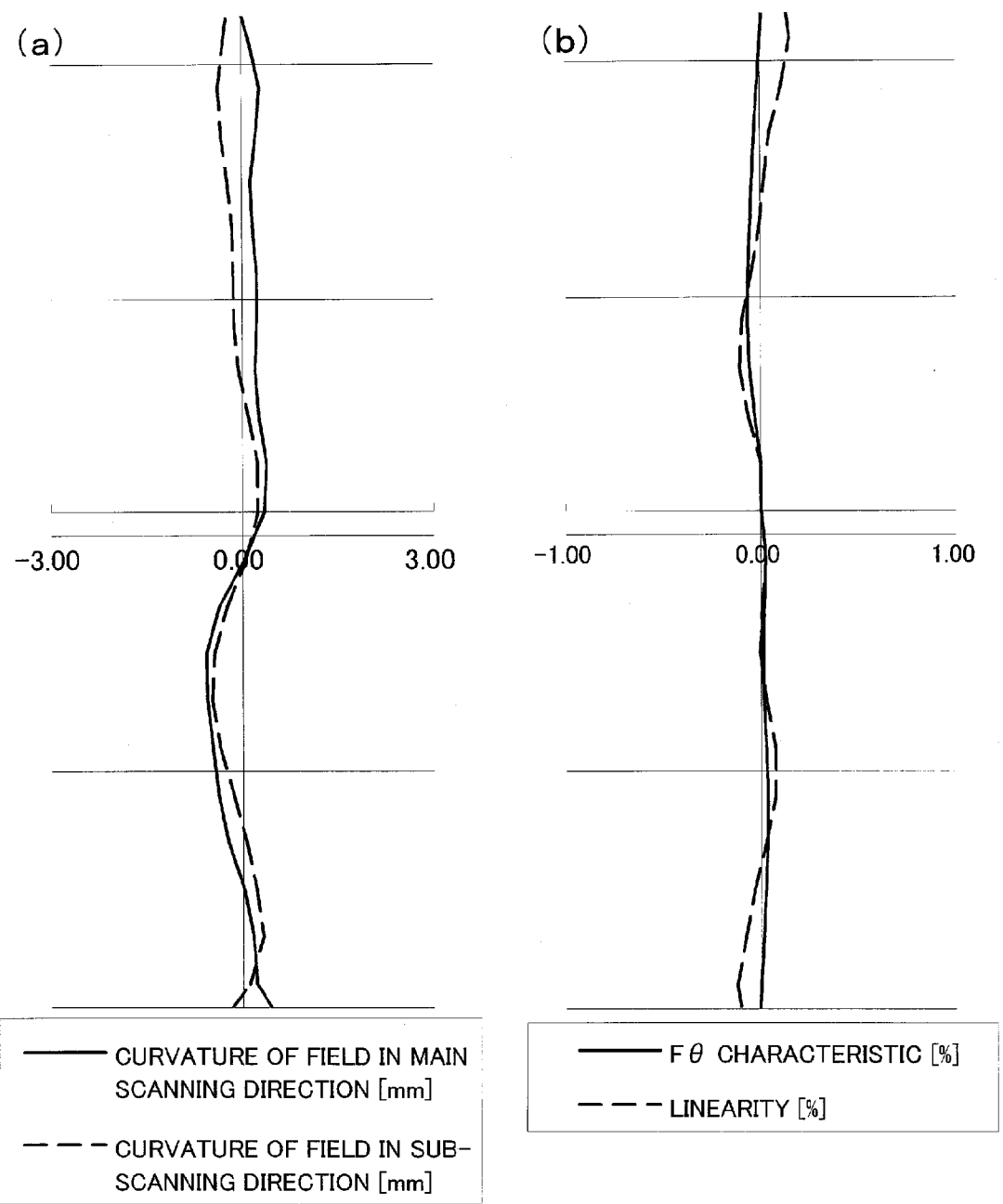
FIG. 19A is a graph showing curvatures of field in the main scanning direction and in the sub-scanning direction, obtained from Example 6.
FIG. 19B is a graph showing f-theta and linearity characteristics, obtained from Example 6.
Figure 20:
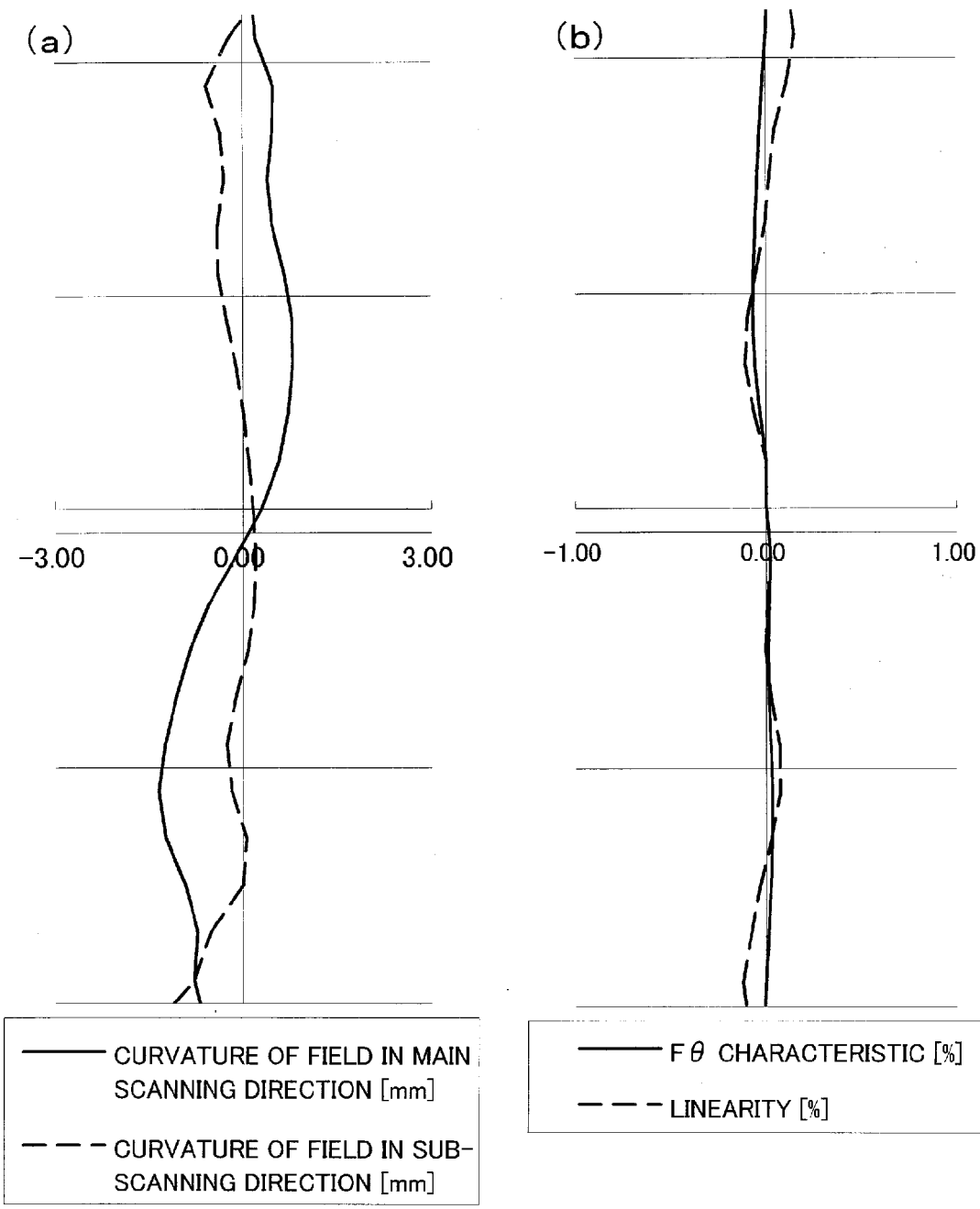
FIG. 20A is a graph showing curvatures of field in the main scanning direction and in the sub-scanning direction, obtained from Example 7.
FIG. 20B is a graph showing f-theta and linearity characteristics, obtained from Example 7.
Figure 21:
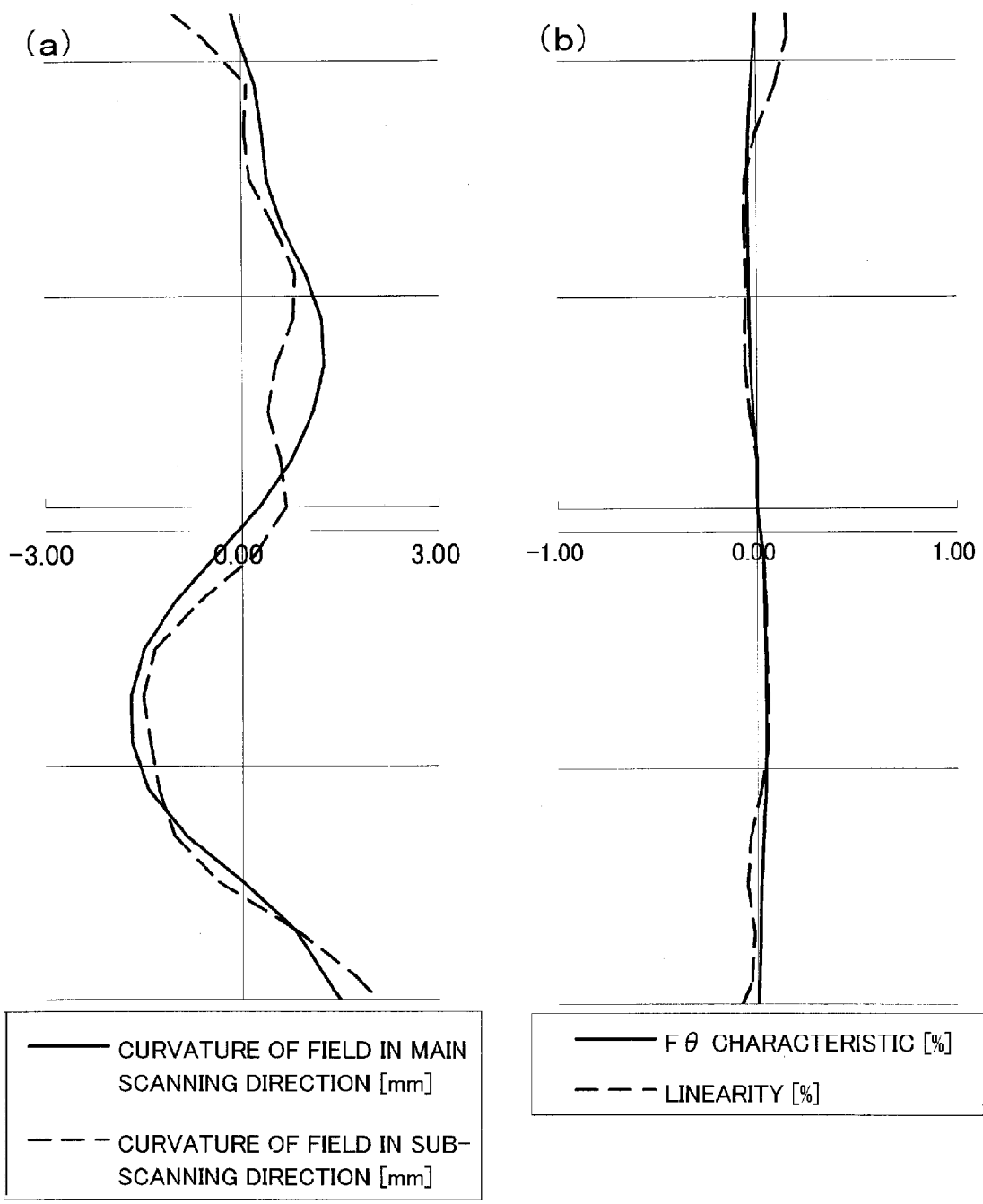
FIG. 21A is a graph showing curvatures of field in the main scanning direction and in the sub-scanning direction, obtained from Comparative Example 1.
FIG. 21B is a graph showing f-theta and linearity characteristics, obtained from Comparative Example 1.
Figure 22:
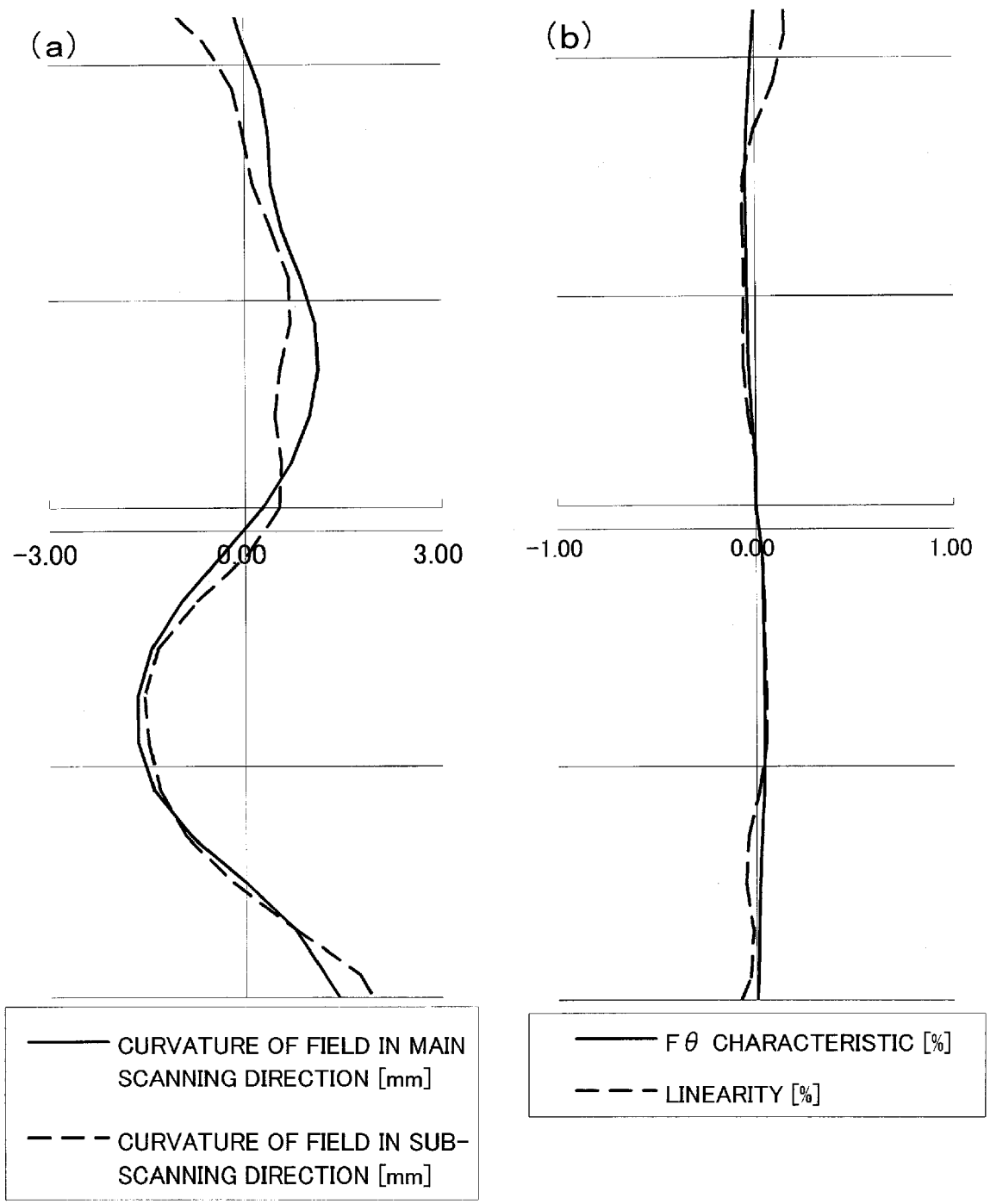
FIG. 22A is a graph showing curvatures of field in the main scanning direction and in the sub-scanning direction, obtained from Comparative Example 2.
FIG. 22B is a graph showing f-theta and linearity characteristics, obtained from Comparative Example 2.
Figure 23:
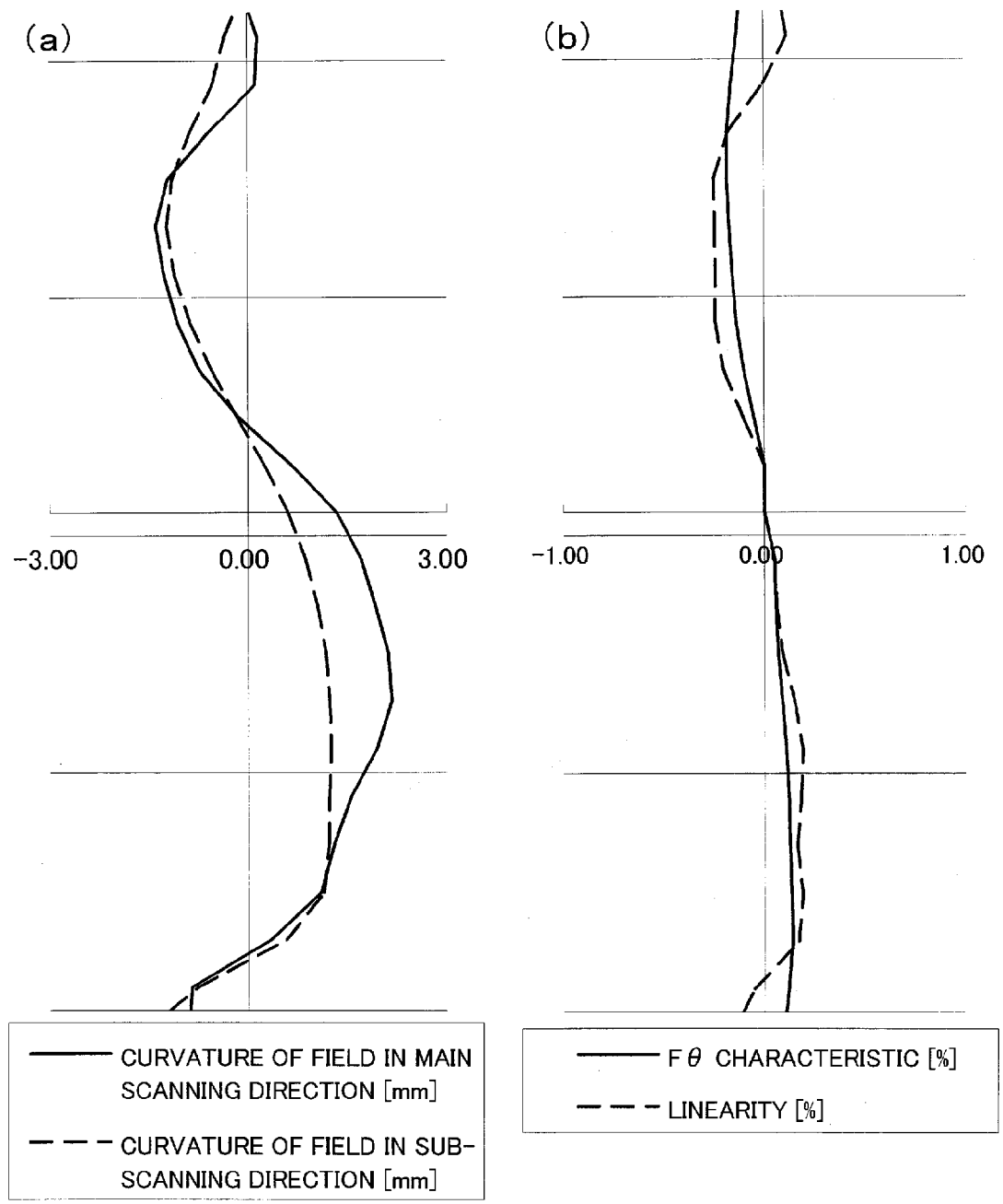
FIG. 23A is a graph showing curvatures of field in the main scanning direction and in the sub-scanning direction, obtained from Comparative Example 3.
FIG. 23B is a graph showing f-theta and linearity characteristics, obtained from Comparative Example 3.

With the arrangement designed in accordance with the present embodiment, in which the synchronization detection beam path $P_{bd}$ is located in a position that is opposite to the semiconductor laser 1 across the optical axes A1, A2 of the lens surfaces L1, L2 of the f-theta lens 6, if the point of incidence of the beam of light from the illumination optical system 14 on the specular surface 5A of the polygon mirror 5 were so close to the axis 5B of rotation of the polygon mirror 5, the beam of light could not be reflected toward the synchronization detection beam path $P_{bd}$ by the specular surface 5A oriented to a degree enough to reflect the beam of light toward the synchronization detection beam path $P_{bd}$, in that the beam of light would fail to strike the mirror 5A oriented as such. With this in view, a distance h between the axis 5B (center) of rotation of the polygon mirror 5 and a center of the beam of light incident on the polygon mirror 5 is set within an adequate range. In this embodiment, as shown in FIGS. 1 and 3, the distance h is set to fulfill the following conditions:

$$R(\sin((\alpha-\theta_{bd})/2)-\cos((\alpha-\theta_{bd})/2)\times\tan(\pi/N))\times(b_{bd}/2)\times \\ \cos((\alpha-\theta_{bd})/2)<h, \text{ and } h<R(\sin((\alpha-\theta_{eos})/2)+\cos \\ ((\alpha-\theta_{eos})/2)\times\tan(\pi/N))-(b_{eos}/2)\times\cos((\alpha-\theta_{eos})/2) \qquad (1)$$

where R indicates a radius of an inscribed circle of the polygon mirror 5, N indicates the number of specular surfaces of the polygon mirror 5, α indicates an angle [rad] formed by the beam of light incident on the polygon mirror 5 with a reference line DL extending in a direction of travel of the beam of light to be incident on the scanned surface 9A at right angles after being reflected off the polygon mirror 5, $\theta_{bd}$ indicates an angle [rad] formed by the beam of light traveling from the polygon mirror 5 along the synchronization detection beam path $P_{bd}$ with the reference line DL, $\theta_{eos}$ indicates an angle [rad] formed by the beam of light reflected off the polygon mirror 5 at an end-of-scan position with the reference line DL, and $b_{eos}$ and $b_{bd}$ indicate breadths of the beam of light in the main scanning direction on each of the specular surfaces 5A of the polygon mirror 5 at the end-of-scan position and at a position in which the beam of light reflected off the polygon mirror 5 travels along the synchronization detection beam path $P_{bd}$, respectively. When the distance h satisfies these conditions (1), symmetry of a sag in the position of reflection at the polygon mirror 5 with respect to the reference line DL is relatively low.

As seen in FIG. 1, a distance from the point of reflection at the specular surface 5A to the lens surface L1, and a distance from the lens surface L2 to the scanned surface 9A varies with an image height y on the surface 9A. The position at which a beam of light from the illumination optical system 14 strikes the specular surface 5A of the polygon mirror 5 varies with a direction of deflection. Therefore, a distortion (aberration) of an image such as a curvature of field occurs on the surface 9A.

In order to correct the aberration in a satisfactory manner, the scanning optical apparatus 10 in the present embodiment is configured to satisfy the following condition (2) and at least one of the following conditions (3) and (4):

$$-0.6 < \beta 2 \leq -0.1 \quad (2)$$

$$-0.5 < \beta 1 < 0 \quad (3)$$

$$-0.1 < D2 < 0.2 \quad (4)$$

where β2 indicates an angle [deg] formed in a main scanning plane between the first optical axis A1 of the incident-side lens surface L1 and the second optical axis A2 of the exit-side lens surface L2 of the f-theta lens 6 (i.e., tilt amount), 131 indicates an angle [deg] formed in the main scanning plane between the first optical axis A1 and the reference line DL (i.e., lens tilt amount), and D2 indicates an amount of shift [mm] in the main scanning plane, of a point O2 of intersection between the second optical axis A2 and the exit-side lens surface L2, from the first optical axis A1. The angles β1 and β2 are expressed with the clockwise direction in FIG. 1 (the direction of rotation from the reference line DL toward the semiconductor laser 1) assumed to be positive, and the amount D1 (and D2 mentioned below) of shift is expressed with the upward direction in FIG. 1 (the direction perpendicular to the reference line DL and opposite to the direction toward the semiconductor laser 1) assumed to be positive.

To achieve preferable image qualities, the scanning optical apparatus 10 may be configured to satisfy the both of the conditions (3) and (4).

To achieve more preferable image qualities, the scanning optical apparatus 10 may be configured to have the amount D1 [mm] of shift in the main scanning plane, of a point O1 of intersection between the first optical axis A1 and the incident-side lens surface L1, from the reference line DL (i.e., lens shift amount) satisfying the following condition.

$$-0.7 < D1 < 0 \quad (6)$$

A distance between a point on the lens surface L2 through which the beam of light at the start-of-scan position exits and a point on the lens surface L2 through which the beam of light at the end-of-scan position exits varies according to the set values of $\theta_{sos}$ and $\theta_{eos}$ where $\theta_{sos}$ indicates an angle [rad] formed by the beam of light reflected off the polygon mirror 5 at a start-of-scan position with the reference line DL. With this in view, $\theta_{sos}$ and $\theta_{eos}$ may be set at values different from each other, such that the following condition is satisfied:

$$|\theta_{sos}| > |\theta_{eos}| \quad (7)$$

to thereby reduce the size in the main scanning direction of the f-theta lens 6 so that the scanning optical apparatus 10 can be designed to be compact in size.

Moreover, in the present embodiment, 0<R1 and 0<R2 are satisfied wherein R1 and R2 indicate paraxial radii of curvature in the main scanning plane of the lens surfaces L1, L2, respectively. In other words, the lens surface L1 has a convex shape in the main scanning plane with the point O1 of intersection being in a position closer to the polygon mirror 5, and the lens surface L2 has a concave shape in the main scanning plane with the point O2 of intersection being in a position closer to the polygon mirror 5.

With this configuration, thicknesses of portions of the f-theta lens 6 adjacent to the both ends thereof in the main scanning direction (i.e., distance between the lens surface L1 and the lens surface L2) can be designed to be thick so that the f-theta lens 6 can be manufactured with increased ease.

The following examples describe the ranges of the amounts D1, D2 of shift and the tilt amounts β1, β2 in the lens surfaces L1, L2 which serve to achieve good image qualities with reduced curvatures of field.

In each example, the two opposite lens surfaces L1, L2 of the f-theta lens 6 were both configured to be toric. The lens surfaces L1, L2 of the f-theta lens 6 provided in the scanning optical apparatus 10 in the examples have the shapes in the main scanning direction and the sub-scanning direction as represented by the following formulae.

When the intersection point between each lens surface L1, L2 of the f-theta lens 6 and the optical axis A1, A2 is taken as an origin, the optical axis direction is taken as a z-axis, and an axis orthogonal to the optical axis in the main scanning plane is taken as a y-axis, the meridional direction corresponding to the main scanning direction is given by the following formula:

$$z = \frac{c_y y^2}{1 + \sqrt{1 - (1 + cc)c_y^2 y^2}} + A_4 y^4 + A_6 y^6 + A_8 y^8 + A_{10} y^{10} + A_{12} y^{12} \quad (8)$$

where $c_y$, cc, $A_4$, ..., $A_{12}$ are constants.

The sagittal direction corresponding to the sub-scanning direction is given by the following formula:

$$s = \frac{\frac{x^2}{r'}}{1 + \sqrt{1 - \left(\frac{x}{r'}\right)^2}} \quad (9)$$

Herein, the radius r' of curvature in the sub-scanning direction at a point on the y-coordinate of each lens surface L1, L2 is given, with the reciprocal cx of the radius of curvature in the sub-scanning direction on the corresponding optical axis A1, A2, as follows:

$$r' = 1/cx(1 + B_2 y^2 + B_4 y^4 + B_6 y^6 + B_8 y^8 + B_{10} y^{10} + B_{12} y^{12}) \quad (10)$$

where cx, $B_2$, ..., $B_{12}$ are constants.

The optical systems including the lenses with the lens surfaces L1, L2 of which the shapes are represented by the above formulae (8)-(10) were prepared for Examples 1-7 and Comparative Examples 1-3. The characteristics of the optical systems (including the constants of the lenses) employed in Examples 1-7 and Comparative Examples 1-3 are shown in FIGS. 4-13, respectively.

In Examples 2-4, 6, 7 and Comparative Examples 1, 3, the values of the lens shift amount D1, the lens tilt amount β1, the shift amount D2 of the lens surface L2, and the tilt amount β2 of the lens surface L2 were set by first determining whether or not each value has the fixed value of 0 (zero), and then selecting an adequate combination of these values which is expected to produce good results in the characteristics such as curvatures of field in the main and sub-scanning directions, f-theta characteristics, and linearity, using optical design software such as CODE V provided by Optical Research Associates (ORA) and ZEMAX provided by ZEMAX Development Corporation. In Example 1, all the values of the lens shift amount D1, the lens tilt amount β1, the shift amount D2 of the lens surface L2, and the tilt amount β2 of the lens surface L2 were freely selected without constraints (i.e., no value fixed to zero) using the above software.

In Example 5, the tilt amount β2 of the lens surface L2 is fixed to −0.100, and the other values were determined using the above software. In Comparative Example 2, the tilt amount β2 of the lens surface L2 is fixed to −0.050, and the other values were determined using the above software.

In all of the Examples and Comparative Examples, the radius R of the inscribed circle of the polygon mirror 5 and the number N of specular surfaces of the polygon mirror 5 were set at the same values: R=12.99 mm and N=6. The other values were: h=9.8 mm, $\theta_{bd}$=−0.78125 rad, and $\theta_{eos}$=0.68750 rad. With these examples designed as described above, $b_{bd}$=5.625 mm and $b_{eos}$=2.788 mm, and thus the formulae represented in (1) were calculated as follows: $R(\sin((\alpha-\theta_{bd})/2)-\cos((\alpha-\theta_{bd})/2)\times\tan(\pi/N))+(b_{bd}/2)\times\cos((\alpha-\theta_{bd})/2)$= 9.337<h, h<$R(\sin((\alpha-\theta_{eos})/2)+\cos((\alpha-\theta_{eos})/2)\times\tan(\pi/N))-(b_{eos}/2)\times\cos((\alpha-\theta_{eos})/2)$=10.234>h which showed that the conditions (1) were satisfied.

The results of the optical design described above were graphically illustrated in FIGS. 14-23 in which the curvatures of field, f-theta characteristics and linearity of the optical system were shown. Peak-to-valley values of these characteristics were tabulated with the values of the lens shift amount D1, the lens tilt amount β1, the shift amount D2 of the lens surface L2, and the tilt amount β2 of the lens surface L2, and shown in FIG. 24.

As shown in FIG. 24, the scanning optical apparatuses 10 implemented in Examples 1-7, regardless of their propensity toward such a "sag" phenomenon as to be relatively asymmetric with respect to the reference line DL because of their h-value satisfying the conditions represented by the formula (1) described above, the optical properties such as curvatures of field derived from such an asymmetric sag generating propensity, as well as f-theta characteristic and linearity were compensated, with the result that the PV values of the curvatures of field in the main scanning direction and in the sub-scanning direction were within the range of 3 mm or below. Prior experiments for optimizing the optical properties has shown that the PV values of the curvatures of field in the main scanning direction and in the sub-scanning direction would be far more than 3 mm even if the sag were rendered nearly symmetric with respect to the reference deflected chief ray. It has been shown that the optical properties achieved in Examples are superior to those of the prior-art approach.

When the tilt amount β2 of the lens surface L2 were set to 0 as in Comparative Example 1, any attempt of optimization using the above software would result in more than 3 mm PV values of the curvatures of field, and favorable optical properties could not be achieved. It has thus been shown (as confirmed from the results in Examples 1-7) that the tilt amount β2 in the range of −0.6<β2≦−0.1 is advantageous.

When the both of the lens tilt amount β1 and the shift amount D2 of the lens surface L2 were set to 0 as in Comparative Example 3, the PV values of the curvature of field in the main scanning direction were more than 3 mm, and favorable optical properties could not be achieved. It has thus been shown that at least one of β1 and D2 may be unbound from 0 to give these amounts selectable ranges of −0.5<β1<0, and −0.1<D2<0.2, respectively, which turned out to be advantageous ranges.

Although it is optional to give the shift amount D1 a value other than 0, inclusion of D1 in the parameters of optimization using the above software has turned out to be advantageous as evident from Example 1, and it has been shown that the shift amount D1 in the range of −0.7<D1<0 may bring about the better results.

Although the illustrative embodiment of the present invention has been described above, the present invention is not limited to the above-described embodiments. Various modifications and changes may be made to the specific structures and arrangement without departing from the scope of the present invention. For example, the number of specular surfaces may not be limited to six as illustrated, but may be four. The area of each specular surface of a four-surface polygon mirror is broader than that of a six-surface polygon mirror, if the h-value is equal. Therefore, the four-surface polygon mirror is unlikely to cause vignetting, and easy to satisfy the conditions represented by the formula (1). Furthermore, since the relation between each specular surface and the axis of rotation (i.e., specular surfaces rotate about the axis of rotation) in the four-surface polygon mirror is basically the same as that in the six-surface polygon mirror, the values of D1, D2, β1 and β2 are not affected by change in the number of specular surfaces. Accordingly, the four-surface polygon mirror can achieve advantageous results similar to those of the six-surface polygon mirror as described above.

What is claimed is:

1. A scanning optical apparatus comprising:
   a light source;
   a first optical element configured to convert light emitted from the light source into a beam of light;
   a second optical element configured to convert the beam of light having passed through the first optical element into a linear image extending in a main scanning direction;
   a polygon minor configured to deflect the beam of light having passed through the second optical element in the main scanning direction;
   a third optical element configured to convert the beam of light having been deflected by the polygon mirror into a spot-like image to be focused on a scanned surface, the third optical element being a single lens having a pair of opposite incident-side and exit-side lens surfaces having first and second optical axes, respectively, each of the pair of opposite lens surfaces being aspheric in a main scanning direction, and having a curvature in a sub-scanning direction varying continuously and symmetrically from a position corresponding to the optical axis thereof outward in a main scanning direction, each of the pair of lens surfaces having a shape symmetric in the main scanning direction with respect to a sub-scanning plane containing the optical axis thereof; and
   a synchronization detection beam path configured such that the beam of light travels therethrough from the polygon minor to a position that is opposite to the light source across the optical axes of the pair of lens surfaces, to be directed to a sensing element producing a signal for synchronization at a start-of-scan position,
   wherein a distance h between a center of rotation of the polygon mirror and a center of the beam of light incident on the polygon mirror fulfills the following conditions:

$$R(\sin((\alpha-\theta_{bd})/2)-\cos((\alpha-\theta_{bd})/2)\times\tan(\pi/N))+(b_{bd}/2)\times\cos((a-\theta_{bd})/2)<h, \text{ and } h<R(\sin((\alpha-\theta_{eos})/2)+\cos((\alpha-\theta_{eos})/2)\times\tan(\pi/N))-(b_{eos}/2)\times\cos((\alpha-\theta_{eos})/2)$$

where R indicates a radius of an inscribed circle of the polygon mirror, N indicates the number of specular surfaces of the polygon mirror, a indicates an angle [rad] formed by the beam of light incident on the polygon mirror with a reference line extending in a direction of travel of the beam of light to be incident on the scanned surface at right angles after being reflected off the polygon mirror, $\theta_{bd}$ indicates an angle [rad] formed by the beam of light traveling from the polygon mirror along the synchronization detection beam path with the reference line, $\theta_{eos}$ indicates an angle [rad] formed by the beam of light reflected off the polygon mirror at an end-of-scan position with the reference line, and $b_{eos}$ and $b_{bd}$ indicate breadths of the beam of light in the main scanning direction on each of the specular surfaces of the polygon mirror at the end-of-scan position and at a position in which the beam of light reflected off the polygon mirror travels along the synchronization detection beam path, respectively; and wherein the following condition is satisfied:

$0.6 \leq \beta 2 \leq -0.1$ where β2 indicates an angle [deg] formed in a main scanning plane between the first optical axis and the second optical axis of the third optical element, and wherein at least one of the following conditions is satisfied:

$-0.5 < \beta 1 < 0$, and $-0.1 < D2 < 0.2$ where β1 indicates an angle [deg] formed in the main scanning plane between the first optical axis and the reference line, and D2 indicates an amount of shift [mm] in the main scanning plane, of a point of intersection between the second optical axis and the exit-side lens surface, from the first optical axis.

2. The scanning optical apparatus according to claim 1, wherein the both of the following conditions are satisfied:

$-0.5 < \beta 1 < 0$, and $-0.1 < D2 < 0.2$.

3. The scanning optical apparatus according to claim 1, wherein the following condition is satisfied:

$-0.7 < D1 < 0$ where D1 indicates an amount of shift [mm] in the main scanning plane, of a point of intersection between the first optical axis and the incident-side lens surface, from the reference line.

4. The scanning optical apparatus according to claim 1, wherein the following condition is satisfied:

$|\theta_{sos}| > |\theta_{eos}|$ where $\theta_{sos}$ indicates an angle [rad] formed by the beam of light reflected off the polygon mirror at a start-of-scan position with the reference line.

5. The scanning optical apparatus according to claim 1, wherein the following conditions are satisfied:

$0 < R1$ and $0 < R2$ where R1 and R2 indicate paraxial radii of curvature in the main scanning plane of the incident-side and exit-side lens surfaces, respectively.

* * * * *